US005604270A

United States Patent [19]
Klett et al.

[11] Patent Number: 5,604,270
[45] Date of Patent: Feb. 18, 1997

[54] CHEMICAL TREATING COMPOSITION FOR GLASS FIBERS HAVING EMULSIFIED EPOXY WITH GOOD STABILITY AND THE TREATED GLASS FIBERS

[75] Inventors: Michael W. Klett, Allison Park; Kenneth D. Beer, Vandergrift, both of Pa.

[73] Assignee: PPG Industries, Inc., Pittsburgh, Pa.

[21] Appl. No.: 117,471

[22] Filed: Sep. 7, 1993

Related U.S. Application Data

[62] Division of Ser. No. 729,255, Jul. 12, 1991, Pat. No. 5,242,958.

[51] Int. Cl.$^6$ .............................. C08K 3/20; C08L 63/02
[52] U.S. Cl. .................... 523/421; 523/444; 523/501
[58] Field of Search .................................. 523/444, 421, 523/501

[56] References Cited

U.S. PATENT DOCUMENTS

| | | | |
|---|---|---|---|
| 3,827,230 | 8/1974 | Marzocchi et al. | 57/140 |
| 3,923,708 | 12/1975 | Furukawa et al. | 260/22 |
| 3,983,056 | 9/1976 | Hosoda et al. | 260/29.2 EP |
| 4,049,597 | 9/1977 | Motsinger | 260/18 |
| 4,315,044 | 2/1982 | Elmore et al. | 427/386 |
| 4,394,418 | 7/1983 | Temple | 428/391 |
| 4,436,848 | 3/1984 | Haines et al. | 523/426 |
| 4,487,797 | 12/1984 | Watson | 428/268 |
| 4,752,527 | 6/1988 | Sanzero et al. | 428/391 |
| 4,808,478 | 2/1989 | Dana et al. | 428/391 |
| 4,981,754 | 1/1991 | Hau | 428/288 |
| 4,990,549 | 2/1991 | Delvin et al. | 523/209 |

Primary Examiner—Melvyn I. Marquis
Assistant Examiner—D. Aylward
Attorney, Agent, or Firm—Kenneth J. Stachel; James B. Robinson

[57] ABSTRACT

A simplified aqueous sizing composition utilizing a variety of components achieves improved stability, wettability and strength characteristics. The composition utilizes one or more aqueous, soluble, dispersible or emulsifiable bisphenol A type polyester film forming polymers with an epoxy containing film forming copolymer compatible with and soluble in the matrix polymer. One or more organo-silane coupling agents are also utilized. The sizing composition preferably includes a single nonionic surfactant in conjunction with a cationic amidated polyamine lubricant. One or more anti-static agents, generally cationic organic quaternary ammonium salts having one or more alkoxy moieties, are utilized in an effective anti-static amount. An anti-foaming agent may also be utilized for the prevention or suppression of foam during the mixing process. The improved stability and wettability characteristics of the aqueous sizing composition are preferably achieved through the use of a single epoxidized surfactant. Compositions formed from this surfactant are effective at one-half the surfactant level and retain their static emulsion stability for 48 hours or more. This is accompanied by a 50 percent improvement in dry sliver abrasion with no apparent negative effects on the mechanical properties of the resultant glass fiber.

16 Claims, 1 Drawing Sheet

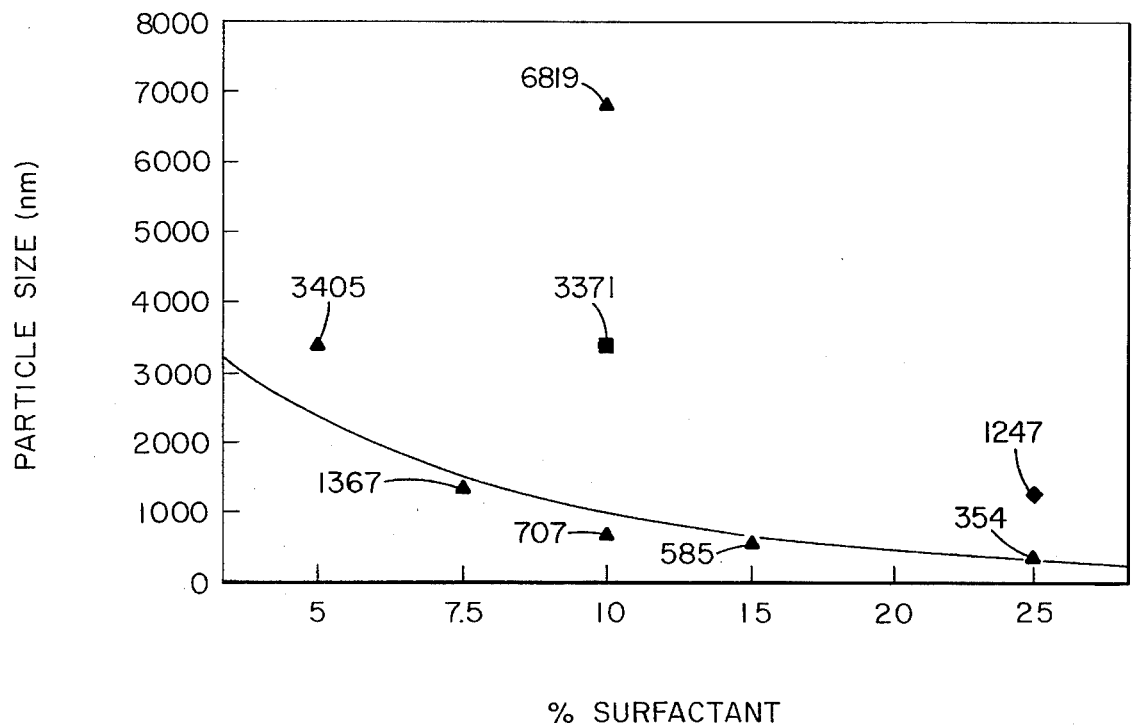

Component# CHEMICAL TREATING COMPOSITION FOR GLASS FIBERS HAVING EMULSIFIED EPOXY WITH GOOD STABILITY AND THE TREATED GLASS FIBERS

CROSS REFERENCE TO RELATED APPLICATION

This application is a division of Ser. No. 729,255 filed Jul. 12, 1991, now U.S. Pat. No. 5,242,958, issued Sep. 7, 1993.

BACKGROUND OF THE INVENTION

1. Field of the Invention

The present invention relates to an aqueous chemical treating composition for use with glass fibers. More specifically, the invention relates to an aqueous chemical treating composition having a simplified composition with increased stability and reduced settling characteristics which is useful in reinforcing polymers. The aqueous chemical treating composition further utilizes a simplified epoxy emulsion or dispersion.

2. Description of the Prior Art

Glass fibers, in various forms, are utilized in a variety of durable lightweight materials. The glass fibers may be provided in several forms, which are then incorporated into a polymeric matrix such that they can be shaped and fixed in particular hardened forms. The glass fiber itself is utilized in a variety of forms. Each of these forms begins with the basic glass fiber, which is formed in a process which draws molten streams of glass material from a flowing reservoir of molten glass. The glass material has a composition such that the glass may be drawn into thin resilient fibers having mechanical characteristics which permit flexure and manipulation of the fiber after drying. The molten stream of fiberizable glass material is passed over a bushing which provides a plurality of holes through which the glass material may be drawn. The molten material is passed through the bushing, forming a plurality of glass fibers. Immediately after the newly formed glass fibers are drawn from the bushing, a chemical treating composition is applied to their surfaces. This chemical treating composition, or sizing, is usually an aqueous composition and is formed of a variety of components. The sizing is primarily utilized to retard abrasion between the glass fibers when they are gathered onto a variety of storage media such as a spool. The sized glass fiber strand additionally has improved strength and flowability when compared to the non-sized fiber strand.

The glass fibers which have been sized are collected into a forming package, which is a winding of continuous strand or strands. Alternatively, the strands are chopped during their formation in a process known as wet chopping. Either of these two processes can terminate in a drying step to remove moisture from the strands. The dried continuous strands of multiple forming packages may be combined to form a roving, which may be chopped in its dried form. A single strand of a single forming package may also be chopped. Either process involving the chopping of a dried strand is known as dry chopping.

Once the sized glass fiber has been chopped, it can be introduced into a thermosetting or thermoplastic polymeric substrate and can be utilized to reinforce that substrate and provide improved strength while retaining a relatively light weight. The manipulation of the chopped, sized glass fiber during introduction of that fiber into the polymeric composite requires good flowability of the chopped strands. This good flowability is achieved by reduction of interstrand friction and is provided by the dried sizing on the surface of the strands. Furthermore, during chopping, the glass fibers may fray or splinter at the chopped ends. This produces a large number of small abrasive particles which may abrade or damage the otherwise acceptable fibers. The sizing is utilized to protect the glass fibers from abrasion during formation and processing and further increases the integration of the strand to reduce the breakdown of the strand into filaments or slivers when chopped. This increased strand integrity must further be retained after chopping to provide added strength when the fiber is incorporated in the polymeric material.

Fiber reinforced composites can be produced from thermosetting molding compounds such as bulk molding compound and sheet molding compound or from thermoplastic molding compounds. The bulk molding compound is generally a resin-based compound having short glass fibers impregnated therein. These short glass fibers are generally of a length of about ⅛ to ½ inch. The other components of the bulk molding compound include fillers, pigment, a catalyst, thickeners and other specialized additives which vary based on the application of the ultimately formed compound. The bulk molding compound typically has a glass content between 10 and 25 weight percent and is generally formed into logs or ropes. The sheet molding compound is also a resin-based compound further incorporating filler, chopped strand reinforcement, a release agent and a catalyst which is processed into a sheet form. The sheet molding compound may also include chemical thickeners such as alkaline earth oxides and hydroxides to increase the viscosity of the material. As opposed to the bulk molding compound, the glass fiber is chopped to a length of ½ to 1 inch for this application and is utilized in a weight range of approximately 25 to 45 percent. The sizing composition also protects the glass fibers from abrasion during the formation of the compounds and further increases the compatibility between the glass fibers and the substrate within which they are to be dispersed. The sizing compound reduces abrasion both between glass fibers themselves and between glass fibers and the polymeric matrix.

Glass fiber is also utilized to reinforce polymeric matrixes for use in clear or translucent reinforced plastic panels. These panels are utilized in solar collectors, skylights, light fixture covers and the like, and require glass fibers having particular optical characteristics in addition to the strength and mechanical characteristics previously described. The glass fibers must not reduce the clarity of these panels and must be even more completely and consistently dispersed throughout the matrix to provide consistent optical characteristics. In the optical environment, it is desirable to achieve a fast wet-out of the glass fibers in the polymeric matrix. Wet-out is a characteristic which refers to the encapsulation of the glass fibers by the matrix polymer. This is a measure of the apparent intimacy of contact between the polymeric matrix and the glass fibers. The polymeric matrix should quickly and easily envelop the glass fibers to provide a smooth and uniform compound without external visibility of the glass fibers within the material. The processability, curing characteristics and surface properties of the final material will be affected if fast wet-out is not achieved.

A number of sizing compositions for glass fibers have been developed to address these particular needs and to achieve these characteristics with the minimum number of components and mixing steps. Typically sizing compositions are aqueous compositions utilizing lubricants, film formers, coupling agents, wetting agents and emulsifiers to provide these characteristics. Temple, U.S. Pat. No. 4,394,418, issued Jul. 19, 1983, discloses an aqueous sizing composition utilizing aqueous, dispersible, emulsifiable or solubiltzable film formers including a vinyl acetate-organo silane copolymer and a 1,2-polyepoxide polymer having a weight ratio of 95 to 5 to 5 to 95 weight percent between the silane copolymer to the polyepoxide polymer. The disclosed aqueous sizing composition also utilizes one or more nonionic surfactants in an aqueous, dispersible, solubilizable or emulsifiable polyamide and/or fatty acid amide and at least one silane coupling agent which is an epoxy-containing organo silane coupling agent or an amino-containing organo silane coupling agent or a mixture thereof. The aqueous sizing composition also has a blend of an aqueous, dispersible, solubilizable or emulsifiable polyethylene containing polymer and a wax where the weight ratio of the polyethylene-containing polymer to wax is in the range of about 25 to 1 to about 1 to 25. In certain circumstances the wax may be deleted or reduced. Water is also present and the sizing composition may contain an organic hydrocarbon acid or polyacid to provide a pH of between 4 and 9.

The nonionic surfactants disclosed in the Temple reference are specifically described as having a hydrophilic/lipophilic balance (HLB) in the range of about 10 to 20 and alkyl aryl polyether nonionic surfactant is preferably utilized having an HLB of 14. The nonionic surfactant is provided in the weight percent range of between 0.05 to 3 of the entire composition and approximately 0.1 to 5 weight percent of the total solids.

The use of surfactants is also disclosed in Sanzero, U.S. Pat. No. 4,752,527, issued Jun. 21, 1988. The Sanzero reference discusses the use of condensates of ethylene oxide with hydrophobic bases formed by condensation with propylene oxide and propylene glycol. The reference utilizes these surfactants in a sizing composition formed by a polyester resin combined with an epoxy resin a polyethylene glycol emulsifier, octylphenoxypolyethylene oxyethanol emulsifier, polyvinyl pyrrolidone film former, methacryloxypropyltrimethoxysilane, acetic acid and a glass fiber lubricant. The references teaches only the use of the methacryloxypropyltrimethoxysilane coupling agent. Furthermore, a strand hardening agent is preferred to overcome a detrimental quantity of chopper cling.

It has been recently discovered that the previously discussed emulsion surfactants can have limited stability characteristics. It is generally observed that micelles agglomerate and settle out within one-half to two hours. This requires a vigorous agitation shortly before any use of the mixture which may be very inconvenient in a commercial setting.

There remains, therefore, a need in the art for a simplified sizing composition which provides improved strength and flow properties when applied to glass fibers which are utilized in a thermosetting polymeric composite and which exhibits extended stability times. This will reduce the amount of handling attention required when utilizing the compound in a commercial setting. Additionally, there remains a need in the art for the use of a simpler sizing composition which exhibits improved stability. This sizing compound should further provide increased wet-out and mechanical properties imparted to the glass fiber to reduce filamentization and particle creation during the chopping process.

SUMMARY OF THE INVENTION

An aqueous epoxy resin containing sizing composition is disclosed which utilizes a reduced number of components to achieve improved stability, wettability and fiber reinforced plastic (FRP) strength characteristics as compared to the prior art. The composition utilizes one or more epoxy resins alone or with a second film forming resin that can be a polyester like an aqueous, soluble, dispersible or emulsifiable bisphenol A type polyester film forming polymers or a polyurethane or poly(urea urethane) or a polyesterurethane or a polyetherurethane. Another non-aqueous component is one or more organo-silane coupling agents. The epoxy resin or polymer is used in the form of an oil-in-water emulsion or dispersion that is prepared with at least an epoxide-capped polyol nonionic surfactant. The aqueous sizing composition can also utilize a cationic amidated polyamine lubricant. Another non-aqueous component can be one or more anti-static agents that are generally cationic organic quaternary ammonium salts having one or more alkoxy moieties in an effective anti-static amount. An anti-foaming agent may also be utilized for the prevention or suppression of foam during the mixing process.

The improved stability and wettability characteristics of the aqueous sizing composition are preferably achieved through the use of at least a single epoxidized surfactant for the epoxy resin. The use of this single surfactant is intended to replace the two or more component packages that have been utilized in the prior art. It has been observed that compositions formed from this surfactant are effective at a reduced level, half the surfactant level, and retain their emulsion stability for 48 hours or more. This achievement is accompanied by a 50 percent improvement in dry sliver abrasion over the prior art with no apparent negative effects on the mechanical properties of the resultant glass fiber.

The aqueous sizing composition may be applied to any conventional glass fiber by any conventional method, such as a wet chop forming process or a continuous strand process. When the continuous strand is to be subsequently chopped, the continuous strand should be dried before chopping in a temperature and time sufficient to remove a substantial amount of the moisture and set the cure for the coating. In producing wet chopped fiber strands, the chopped strands are dried at a faster time and higher temperature than for dry chopping to flash the moisture and set the curing of the coating.

These and other advantages and features of the present invention will be more fully understood with reference to the presently preferred embodiments thereof.

BRIEF DESCRIPTION OF THE DRAWING

FIG. 1 is a graph of particle size versus percent surfactant used in the epoxy emulsion for four sizing compositions using different emulsifiers for each size.

DESCRIPTION OF THE PREFERRED EMBODIMENTS

A suitable epoxy-containing polymer or copolymer is one which has an epoxy equivalent weight in the range of approximately 180 to about 290 grams of polymer for one gram equivalent of epoxide. The epoxy-containing polymer or copolymer assists in yielding treated glass fibers with good wettability for fast wet-out of the glass fibers in polymeric matrices such as saturated and unsaturated polyesters and epoxies. The epoxy resin may be utilized in an amount varying from a major to a minor portion of the solids of the sizing. The epoxy resin may be a non-ionic low molecular weight solid or a liquid epoxy polymer. Epoxy resins which may be utilized are those prepared by bisphenol A and a comonomer such as epihalohydrin to form the diglycidyl ether of bisphenol A. Epoxy resins obtained by the use of hydroxyl compounds such as 4-isopropylidene bis(2,6-dibromophenol), dihydroxybenzenes, 1,1,2,2-tetra(p-hydroxy phenyl)-ethane, 1,4-butane diol, glycerol, polyoxyalkylene(glycol), linoleic dimer acids, 1,1,3-tris(p-hydroxyl phenyl)-propane and the like in reaction with epihalohydrin can also be used. Also, epoxy resins produced from aliphatic glycidyl ethers can be used, as well as epoxy resins produced by the reaction of monoepoxy compounds with themselves or other epoxy-generating compounds. For example, unsaturated monoepoxy compounds may be homopolymertzed to produce polyepoxy polymer-like poly-(allyl glycidyl ether). The epoxy resin may be formed from the reaction of an epihalohydrin and a polyhydric phenol. Polyhydric phenols may be, for example, bis (4-hydroxy phenyl )-2,2 propane or bis (hydroxy phenyl )-methane.

Useful commercially available epoxy resins include that available from Shell Chemical Corporation under the trade designation Epon™ 880 epoxy resins.

The epoxy is used in the aqueous sizing composition as a oil-in-water emulsion or dispersion through the use of at least one nonionic epoxy-endcapped polyol surfactant. In the prior art, a number of surfactants were combined to form the nonionic surfactant utilized in the composition. Previous nonionic surfactants utilized in similar sizing compositions were alkyl aryl polyether nonionic surfactants. These were utilized alone and in combination and were generally observed to exhibit significant settling within two hours of mixing. The present composition preferably utilizes a single nonionic epoxidized poly(oxyalkylene) polymer, copolymer and/or terpolymer surfactant wherein the oxyalkylene is a combination of ethyleneoxide and propyleneoxide moieties present to give the polyoxyalkylene a HLB preferably in the range of around 20 to around 30, and wherein the polyoxyalkylene is at least capped with at least one epoxy moiety and wherein the epoxidized polyoxyalkylene is present in an amount in the range of around 1 to around 30 parts per 100 parts of the epoxy film forming polymer. A suitable example of such a polyol is one having the following composition:

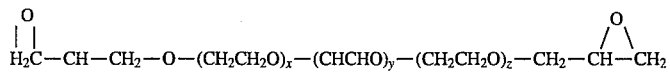

wherein x, y, and z are integers indicating the number of repeating groups for that moiety and the integers generally have values so that the surfactant is a low melting material at around 40° to 50° C. A suitable epoxide polyol of this type is distributed by Synthron, Inc., under the trade name Novepox or Prox E 117. Prox E 117 is a white, waxy solid having a melting point of 45° C., an epoxy equivalent value of 0.023, an epoxide equivalent of 4250 and an HLB of 27. The amount of the nonionic surfactant utilized is generally in the range of approximately around 1 to around 30 parts per 100 parts of the epoxy polymer, copolymer or terpolymer or around 0.05 to about 3 weight percent of the aqueous sizing composition and is preferably around 0.2 to around 0.6 percent. The use of this single surfactant can require only ¼ of the time relative to the standard procedure and provides equivalent or better static stability. Additionally, only ½ of the surfactant previously utilized to achieve these results can be used. An improvement in dry sliver abrasion is also observed when the aforementioned surfactant is used in the epoxy emulsion as is shown in the examples that are presented infra.

The emulsion of the epoxy resin can be formed by any method known to those skilled in the art. A particularly suitable method is to melt the surfactant and add it to the epoxy or vice versa and slowly add the water until the water-in-oil emulsion inverts to a oil-in-water emulsion. Also the amount of water used in the emulsion is that necessary to achieve the oil-in-water emulsion to an amount approaching infinite dilutablity of the emulsion.

In addition to the film forming polymer constituent, the sizing composition also has present one or more acryloxy-containing and/or glycidoxypropyl-containing and/or amino-containing organo-functional coupling agents. The coupling agents can be organo-functional silane coupling agents or organo-functional Werner compounds and the like having on the organo-functioning portion of the molecule the following moiety:

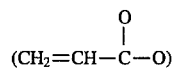

as well as methacryloxy residues such as:

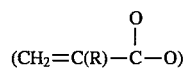

where R is a lower alkyl group having up to four carbon atoms but preferably only one. The preferred embodiment of such a coupling agent is gamma-Methacryloxypropyltrimethoxystlane.

The aqueous sizing composition may also incorporate an amino silane coupling agent. The amino silane coupling agent can be selected from the group of monoamino and diamino silanes. Any monoamino coupling agent would have amino functionality which can be designated by the general formula:

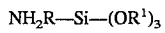

wherein R is an alkylene radical having from 2 to 8 carbon atoms and preferably having 3 carbon atoms and $R^1$ is a lower alkyl radical or hydrogen the lower alkyl radical having 1 to 5 carbon atoms and preferably having two carbon atoms. Some examples of amino silanes include gamma-Aminopropyltriethoxysilane N-(trimethoxysilylpropyl) ethane diamine acrylimide, aminomethyltriethoxysilane, aminopropyltrimethoxysilane, diaminopropyldiethoxysilane, triaminopropylethoxysilane and other similar mono and diamino silanes. The preferred amine coupling agent is gamma-Aminopropyltriethoxysilane. The preferred silane coupling agents are available from Union Carbide Corporation, the methacryloxypropyl-trimethoxysilane being referred to as the A174 silane and the glycidoxypropyltrimethoxysilane that is referred to as A-187, while the aminopropyltriethoxysilane is referred to as A1100.

The methoxy group of the methacryloxypropyltrimethoxysilane and the glycidoxypropyltrimethoxysilane must be hydrolyzed before the silane is incorporated into the aqueous treating composition. This is accomplished by adding an essentially hydrocarbon organic acid which is preferably acetic acid to the coupling agent and stirring for a sufficient time at a sufficient temperature to hydrolyze one or more of the $SiOCH_3$ groups to form methanol and one or more SiOH groups. Sufficient water is used in the hydrolysis to impart sufficient activity to the acetic acid. The amount of silane coupling agent used in the aqueous treating composition is an effective coupling amount in the range of about 0.1 to about 10 weight percent of the solids of the aqueous treating composition where the larger quantities are ordinarily utilized at controlled humidity conditions.

A glass fiber lubricant at an effective lubricating amount is also utilized within the sizing composition. Lubricants are utilized to impart lubricity to the glass fibers which are gathered in bundles and strands. Water soluble cationic materials are provided an example of which includes acid solubilized fatty acid amides such as stearic amide. The fatty acid amides are both saturated and unsaturated and the acid group preferably contains from 4 to 24 carbon atoms. Additionally, anhydrous acid solubiltzed polymers of the lower molecular weight unsaturated fatty acid amides are included. Additionally, the alkyl imidazolines which are formed by reaction of fatty acids with polyalkylene polyamines under conditions to produce ring closure are also utilized. A particularly suitable cationic lubricant is a polyamino amide material having an amine value of about 200 to 800 that is preferably prepared by using fatty acids, at least one of which is pelargonic acid. Also this material can be solubilized further with acetic acid. The preferred embodiment utilizes a polyalkyleneimine partially amidated with fatty acids like pelargonic acid that is commercially available from Emery Industries, Inc., under the trade designation Emerylube® 6717. This material is a viscous liquid with a pour point of 55, a density in pounds per gallon of 8.3, a Gardner color of 10, a cloud point of less than 25° C., a flash point of 282° C. and is soluble in water and dispersible in mineral oil. When the cationic water soluble glass fiber lubricant contains a reactable nitrogen group, the effective amount of the lubricant should be limited, to substantially prevent any crosslinking of any epoxy containing polymer that may be present by the nitrogen containing groups of the glass fiber lubricant. Generally, the effective amount of the glass fiber cationic lubricant is in the range of about 0.05 to about 0.5 weight percent of the aqueous sizing material. Preferably, the lubricant is present in a 0.074 percent amount. The cationic lubricant aids in the processing of the glass fiber strand by imparting a degree of slipperiness to the exterior of the strand at it passes over various types of processing equipment.

When glass fiber strands or rovings are chopped in a dry chopping process, an abundance of static and chopper cling may destroy the glass fibers' ability to be utilized in certain applications. Reducing the static electricity in the system helps reduce the amount of glass fragments which may cling to the chopping device or reduce the clinging ability of the fragmented glass particles to the glass fibers themselves. The sizing composition therefore incorporates an anti-static agent which is preferably a cationic organic quaternary ammonium salt having alkoxy moieties. Generally the quaternary ammonium salt has a formula such as:

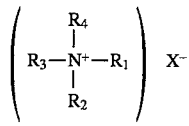

wherein one or more moieties of $R_1$, $R_2$, $R_3$ and $R_4$ can be the same or different alkoxy moieties with or without methylene groups and with a terminal alcoholic group such as:

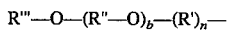

wherein R' is a methylene group and n is a integer from 0 to 10 or more and wherein R" is an ethylene group or propylene group, or mixture thereof, and b is an integer from 1 to 10 or more and wherein R'" is hydrogen or a lower alkyl group having 1 to 10 carbon atoms. When less than four of the groups $R_1$, $R_2$, $R_3$ and $R_4$ are alkoxy groups, the remaining non-alkoxy groups $R_1$, $R_2$, $R_3$ and $R_4$ are alkyl groups having 1 to 30 carbon atoms.

$X^-$ can be any organic or inorganic anion such as carboxylates, sulfinates, sulfates, phosphates and halite ions. This antistatic agent is preferably alkyl dipolyoxyethylene ethyl ammonium ethyl sulfate manufactured by Jordan Chemical Company of Folcroft, Pa., under the trade name Larostat 1084. The amount of antistatic agent is determined such that an antistatic effect is produced but without resulting in such detrimental qualities as fragmentation or adhesion of the fiberglass strands. The amount of the organic quaternary ammonium antistat generally is at least in an amount of approximately 0.05 weight percent of the aqueous treating composition. An increased amount of quaternary ammonium antistat leads to increasing chopper cling and is therefore detrimental. Generally the range of this component is between approximately 0.05 to about 0.4 and is preferably 0.138 percent.

A small amount of an antifoaming agent may be added to the mixture to reduce foaming. A silicone based anti-foam emulsion is preferably utilized to prevent foam formation. Polydimethylsiloxane produced by Union Carbide under the trade name SAG® 10 is preferred for this use.

The aqueous chemical treating composition can be applied to the glass fibers by any method known to those skilled in the art such as during the formation of the glass fibers after the glass fibers have cooled to a sufficient temperature to allow the application of the aqueous chemical treating composition. The sizing is applied to these glass fibers by applicators having belts, rollers, sprays and the like. The treated glass fibers can then be gathered into one or more strands and collected onto a forming package. Additionally the glass fibers can be collected into one or more strands and wet chopped. Also the glass fibers can be gathered into one or more strands and collected as a roving. The glass fibers are then dried to reduce their moisture content. Preferably, the chemically treated glass fibers are dried at temperature and time conditions equivalent to a temperature in the range of about 121° C. to 149° C. for approximately 11 hours. The drying can be accomplished in any conventional glass fiber drying oven such as forced air ovens, di-electric ovens and the like. This results in a dried residue of the aqueous chemical treating composition being present on the surfaces of the glass fibers making up the strands. Preferably the amount of dried residue on the glass fibers is in the range of about 0.5 to around 2 weight percent LOI.

FIG. 1 shows the particle size in nanometers of four sizing compositions each with a different epoxy emulsion having a given amount of the surfactant. The surfactant is the Prox E 117 material for the triangular symbols that are connected by the best fit curve. The diamond symbol represents an epoxy emulsion made with the three component emulsifier system having: Pluronic F-108 Poly(oxy- ethylene-oxypropylene) copolymer from BASF Corp., Emulphor EL-719 polyoxyethylated vegetable oil from GAF Corp., and Igepal CA-630 octyl phenoxypoly(ethyleneoxyethanol), also from GAF Corp. The square symbol represents an emulsion made with a Pluronic F-68 surfactant, and the pyramid symbol indicates an emulsion made with a Pluronic F-108 surfactant. The values over the symbols are the exact particle size measurement in nanometers. The size of the diamond symbol is a control that was made according to example 1 of Table 2. The sizes of the square and pyramid symbols were controls that were made according to the formulation in example 2 of table 2 where the particular surfactant was substituted for the Prox E material.

The emulsions and the sizes containing the emulsions of FIG. 1 were prepared in the following manner. One gallon quantities of sizing compositions were prepared according to Table 2 by the following procedure. Combine EPON 880 and the specified surfactant(s) and heating to 140° to 160° F. with thorough mixing. When the desired temperature was obtained, high shear mixing was started, followed by slow addition of hot water to emulsify the epoxy resin. A solution of PVP K-30 made with hot water was added to the epoxy mixture. A-187 silane (and A-174 silane where specified) was hydrolyzed in acidified water and then added to main mixture. Solutions of PEG 600ML and Emery 6717 made with hot water were prepared and then added to the above mixture.

TABLE 1

Sedimentation of Various Epoxy Resin Surfactant Combinations.

| Example No. | Surfactant Level (grams/gallon) | | | Sediment per 24 Hr. (ml) |
|---|---|---|---|---|
| | PROX E | Emulphor E1-719 | Igepal CA-630 | |
| 1 | 0 | 20.4 | 20.4 | 8 |
| 2 | 0 | 0 | 40.8 | 10 |
| 3 | 40.8 | 0 | 0 | 1 to 2 |
| 4 | 27.2 | 0 | 13.6 | 5 |
| 5 | 27.2 | 13.6 | 0 | 6 |
| 6 | 20.4 | 20.4 | 0 | 2 to 3 |
| 7 | 20.4 | 0 | 20.4 | 9 |
| 8 | 13.6 | 13.6 | 13.6 | 14 to 15 |
| 9 | 13.6 | 0 | 20.4 | 9 (after 1.5 hours) |
| 10 | 0 | 27.2 | 27.2 | 7 to 8 (after 1.5 hours) |

EXAMPLE 1

One gallon of sizing composition was prepared first by combining EPON 880 (272 grams) and the specified surfactant(s) in Table 1 and heating to 140° to 160° F. with thorough mixing. When the desired temperature was obtained, high shear mixing was started, followed by slow addition of hot water to emulsify the epoxy resin. A solution of poly(vinylpyrrolidone) (PVP K-30) (24 grams) made with hot water was added to the epoxy mixture. A-187 silane (27.6 grams) was hydrolyzed in acidified water and then added to main mixture. Solutions for poly(ethylene)glycol (PEG) 600ML (11.4 grams) and Emery (6717 (5.2 grams) cationic lubricant made with hot water were prepared and then added to the above mixture.

TABLE 2

| Component | 1 | 2 | 3 | 4 |
|---|---|---|---|---|
| EPON 880 | 38.5 | 40.8 | 14.7 | 16.0 |
| Pluronic F-108 | 3.8 | 0 | 14.7 | 0 |
| Emulphor EL-719 | 3.8 | 0 | 14.7 | 0 |
| Igepal Ca-630 | 1.93 | 0 | 7.35 | 0 |
| Prox E | 0 | 7.2 | 0 | 24 |
| PVP K-30 | 3.4 | 3.4 | 12.9 | 12.9 |
| A-187 | 3.4 | 3.4 | 10.8 | 10.8 |
| A-174 | 0 | 0 | 16.2 | 10.8 |
| PEG 600 ML | .53 | .53 | 6.16 | 6.16 |
| Emery 6717 | .24 | .24 | 2.8 | 2.8 |

Table 3

Effect of Surfactant on Roving Fuzz

The sizes of Table 2 were applied to glass fibers that were gathered into strands produced wer tested for the average fuzz weight and the results are given in Table 3 below:

| Experiment # | LOI (%) | Average Fuzz Weight (grams) |
|---|---|---|
| 1 | 0.68 | 0.89 |
| 2 | 0.64 | 0.28 |
| 2 | 0.60 | 0.44 |
| 2 | 0.57 | 0.36 |
| 3 | 0.56 | 1.71 |
| 3 | 0.27 | 1.04 |
| 4 | 0.56 | 1.58 |
| 4 | 0.35 | 0.62 |

TABLE 4

Standard Surfactant Package vs. Novepox: Wet Strength Retentions

| INGREDIENTS | kg/100 gal. EXAMPLE 3 | kg/100 gal. EXAMPLE 4 |
|---|---|---|
| A-174 | 0.878 | 0.878 |
| Acetic Acid | 0.058 | 0.058 |
| Stypol 044-A624-70 | 30.26 | 30.26 |
| EPON Resin 880 | 5.18 | 5.18 |
| Novepox Tan-117 | 0.914 | xxx |
| Igepal CA-630 | xxx | 0.271 |
| Emulphor EL-719 | xxx | 0.483 |
| Pluronic F-108 | xxx | 0.483 |
| A-1100 | 0.201 | 0.201 |
| Emery 6717 | 0.280 | 0.280 |
| Larostat 1084 | 0.524 | 0.524 |
| Flex Str. 20 hr. WB 470 | 18539 psi | 17580 psi |
| Dry Flex Str. in 470 | 20440 psi | 25330 psi |
| Glass content % | 27.4% | 31.3% |
| Flex Str. 20 hr. WB 6694 | 17000 psi | 13290 psi |
| Dry Flex Str. in 6694 | 18470 psi | 19710 psi |
| Glass content % | 26.3% | 32.3% |

The sizes of table 4 were prepared in the following manner. One hundred gallons of the sizing compositions were prepared in the following manner: A-174 and A-1100 were hydrolyzed in premix tanks. The Emery 6717 and Larostat 1084 were added to hot water in separate premix tanks. The EPON 880 was heated to 130° F. with the surfactant package (either Novepox Tan 117 or Igepal GA-630, Emulphor EL-719, and Pluronic F-108) and then emulsified with hot DI water using an eppenbach mixer. The EPON emulsion was then added to a main mix tank containing tile Stypol 044-A624-70 solution. The A-174, A-1100, Emery 6717, and Larostat 1084 premtxes were then added to the main mix tank in that order. Solids were adjusted to 6.0% with DI water, pH adjusted to 4.5±1 with acetic acid and foam controlled with Sag 10.

While a present preferred embodiment of the invention is described, it is to be distinctly understood that the invention is not limited thereto but may be otherwise embodied and practiced within the scope of the following claims.

I claim:

1. An aqueous chemical treating composition for glass fibers comprising:

(a) an aqueous emulsifiable or dispersible epoxy resin;

(b) a film forming polymer selected from the group consisting of:(1) at least one water soluble, dispersible or emulsifiable bisphenol A polyester film forming polymer which is formed from bisphenol A, butene diol, maleic anhydride, maleic acid and adipic acid; (2) polymer that is formed with internal emulsification through ethoxylation; (3) polyurethane; and (4) poly (urea urethane), wherein said film forming polymer is present within a range of 1 to 20 weight percent of the aqueous chemical treating composition;

(c) at least one epoxidized polyol polymer, copolymer or terpolymer wherein the oxyalkylene is a combination of ethyleneoxide and propyleneoxide moieties present to give the polyoxyalkylene an HLB within the range of around 20 to around 30 and wherein the polyoxyalkylene is at least capped with at least one epoxy moiety and wherein the epoxidized polyoxyalkylene is present in an amount in the range of around 1 to around 30 parts per 100 parts of said epoxy resin;

(d) at least one vinyl functional silane coupling agent in an effective coupling agent amount;

(e) at least one amino functional silane coupling agent in an effective coupling agent amount;

(f) at least one fiber lubricant; and (g) water in a sufficient amount to allow the fibers to be treated during their formation.

2. A composition as described in claim 1, wherein said epoxy resin is selected form the group consisting of nonionic low molecular weight solids and liquid epoxy polymers.

3. A composition as described in claim 1, wherein said epoxy resin is selected from the group consisting of epoxy resin that is a difunctional bisphenol A and epihalohydrin liquid epoxy reaction product having an epoxide equivalent weight range between approximately 180 and 290 grams of polymer per gram equivalent epoxide diglycidyl ether of bisphenol A, epoxy resin formed from aliphatic glycidyl ether, epoxy resin formed from monoepoxy compounds, epoxy resin that is a phenolic epoxy, epoxy resin formed from an epihalohydrin and a polyhydric phenol.

4. A composition as described in claim 3, wherein said polyhydric phenol is selected from the group consisting of: bis(4-hydroxy phenyl)-2,2 propane and bis(hydroxy phenyl)-methane.

5. A composition as described in claim 1, wherein said fiber lubricants are water soluble and are selected from the group consisting of: acid solubilized fatty acid amides, alkyl amidazolines, cationic fiber lubricant that is a polyamino amide having an amine value of between approximately 200 and 800, polyalkyleneimine partially amidated with perlargonic acid.

6. A composition as described in claim 5, wherein said cationic fiber lubricant is present in a weight percent range between approximately 0.05 and 0.5 weight percent of the aqueous chemical treating composition.

7. A composition as described in claim 1, further including an antifoaming agent.

8. A composition as described in claim 1, wherein said epoxidized polyol is the sole emulsifier for the epoxy resin.

9. A composition as described in claim 8, wherein said epoxidized polyol is present in a weight percentage range between approximately 0.05 and 3 weight percent of the aqueous chemical treating composition.

10. Glass fibers having at least a portion of their surfaces covered with the dried residue of an aqueous composition containing the chemical treating composition of claim 1.

11. A composition as described in claim 1, wherein said film forming polymer is a bisphenol A polyester film forming polymer which is formed from at least one component selected from the group consisting of bisphenol A, butene diol, maleic anhydride, maleic acid and adipic acid which has an Mw/Mn ratio of approximately 1.12 and an Mz/Mv ratio of around 1.08 and is present as the sole film forming polymer.

12. A composition as described in claim 1, further comprising an antistatic agent which is a cationic organic quaternary ammonium salt which is of the formula:

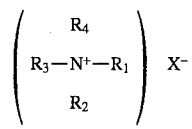

wherein one or more moieties of $R_1$, $R_2$, $R_3$ and $R_4$ can be the same or different alkoxy moieties with or without methylene groups and with a terminal alcoholic group represented by the formula:

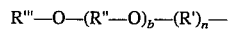

wherein R' is a methylene group and n is an integer from 0 to 10 or more and wherein R" is an ethylene group or propylene group, or mixture thereof, and b is an integer from 1 to 10 or more and wherein R''' is hydrogen or a lower alkyl group having 1 to 10 carbon atoms and when less than four of the groups $R_1$, $R_2$, $R_3$ and $R_4$ are alkoxy groups, the remaining non-alkoxy groups $R_1$, $R_2$, $R_3$ and $R_4$ are alkyl groups having 1 to 30 carbon atoms and $X^-$ is selected from the group consisting of: organic or inorganic anions including halite ions.

13. The aqueous chemical treating composition according to claim 12, wherein thee antistatic agent is alkyl dipolyoxyethylene ethyl ammonium ethyl sulfate.

14. The aqueous chemical treating composition according to claim 1 wherein the vinyl functional silane coupling agent is hydrolyzed methacryloxypropyltrimethoxysilane.

15. The aqueous chemical treating composition according to claim 1, wherein the amino functional silane coupling agent is selected from the group consisting of gamma-aminopropyltriethoxysilane, gamma-aminopropyltrimethoxy-silane, aminomethyltrimethoxy-silane, diaminopropyldiethoxy-silane, triaminopropylethoxy-silane and N-(trimethoxysilylpropyl) ethane diamine acrylamide.

16. A method for making an aqueous sizing composition for glass fibers to yield glass fiber strands useful in reinforcing thermosetting polymers, the method comprising the steps of:

(a) preparing at least one premixture of at least one vinyl functional silane coupling agent, at least one amino functional silane coupling agent in an effective coupling agent amount and a hydrolysis agent to hydrolyze the vinyl functional silane coupling agent and amino functional coupling agent;

(b) preparing a premixture of an aqueous emulsifiable or dispersible epoxy polymer and an epoxidized nonionic surfactant;

(c) adding said premixture of epoxy polymer and surfactant to a film forming polymer selected from the group consisting of: (1) at least one water soluble, dispersible or emulsifiable bisphenol A polyester film forming polymer which is formed from bisphenol A, butene diol, maleic anhydride, maleic acid and adipic acid; (2) polymer that is formed with internal emulsification through ethoxylation; (3) polyurethane; and (4) poly (urea urethane), wherein said film forming polymer is present within a range of 1 to 20 weight percent of the aqueous chemical treating composition, to form a mixture;

(d) adding the premixture of the vinyl functional silane coupling agent and amino functional silane coupling agent to the mixture;

(e) adding one or more fiber lubricants to the mixture; and (f) adding a cationic organic quaternary ammonium salt antistatic agent to the mixture.

* * * * *

UNITED STATES PATENT AND TRADEMARK OFFICE
CERTIFICATE OF CORRECTION

PATENT NO.   :   5,604,270
DATED        :   February 18, 1997
INVENTOR(S)  :   Michael W. Klett and Kenneth D. Beer It is certified that error appears in the above-identified patent and that said Letters Patent is hereby corrected as shown below:

Claim 13, column 12, line 23, delete the extra "e" in the word "thee".

Claim 15, column 12, line 31, delete "-" before the word "silane" to read "aminomethyltrimethoxysilane".

Claim 15, column 12, line 32, delete "-" before the words "silane" to read "propyldiethoxysilane, triaminopropylethoxysilane".

Signed and Sealed this

Twenty-second Day of July, 1997

Attest:

BRUCE LEHMAN

Attesting Officer

Commissioner of Patents and Trademarks